US010823222B2

(12) United States Patent
Hübner et al.

(10) Patent No.: US 10,823,222 B2
(45) Date of Patent: Nov. 3, 2020

(54) ASSEMBLY AND METHOD FOR SECURING A FASTENING ELEMENT

(71) Applicant: BÖLLHOFF VERBINDUNGSTECHNIK GMBH, Bielefeld (DE)

(72) Inventors: Torsten Hübner, Wolfsburg (DE); Martin Jodeleit, Bielefeld (DE); Michael Kahre, Herford (DE); Sandra Steffenfauseweh, Verl (DE)

(73) Assignees: VOLKSWAGEN AG, Wolfsburg (DE); BÖLLHOFF VERBINDUNGSTECHNIK GMBH, Bielefeld (DE)

( * ) Notice: Subject to any disclaimer, the term of this patent is extended or adjusted under 35 U.S.C. 154(b) by 257 days.

(21) Appl. No.: 15/748,942

(22) PCT Filed: Jun. 28, 2016

(86) PCT No.: PCT/EP2016/065010
§ 371 (c)(1),
(2) Date: Jan. 30, 2018

(87) PCT Pub. No.: WO2017/025240
PCT Pub. Date: Feb. 16, 2017

(65) Prior Publication Data
US 2019/0003520 A1    Jan. 3, 2019

(30) Foreign Application Priority Data
Aug. 12, 2015  (DE) .......................... 10 2015 113 288

(51) Int. Cl.
F16B 41/00    (2006.01)
F16B 5/02     (2006.01)
F16B 5/06     (2006.01)

(52) U.S. Cl.
CPC .......... *F16B 41/002* (2013.01); *F16B 5/0258* (2013.01); *F16B 5/0283* (2013.01);
(Continued)

(58) Field of Classification Search
CPC .... F16B 5/0208; F16B 5/0258; F16B 5/0283; F16B 5/0635; F16B 33/02; F16B 33/002;
(Continued)

(56) References Cited

U.S. PATENT DOCUMENTS 2,761,484 A      9/1956   Sternick et al.
5,056,208 A  *  10/1991   Stafford ................... B25B 7/02
                                                29/515
(Continued)

FOREIGN PATENT DOCUMENTS

DE         1937929 U      5/1966
DE     102005015489 A1   10/2005
(Continued)

OTHER PUBLICATIONS

International Search Report dated Aug. 31, 2016 for corresponding PCT Application No. PCT/EP2016/065010 (4 pages).

Primary Examiner — Roberta S Delisle
(74) Attorney, Agent, or Firm — Lewis Roca Rothgerber Christie LLP

(57) ABSTRACT

The invention relates to an assembly for securing a fastening element to a first component, wherein the first component has a passage opening for a shaft of the fastening element,
(Continued)

said assembly comprising a securing element, which reaches around the shaft of the fastening element, wherein a head part of the fastening element and the securing element are arranged on opposite sides of the first component and the shaft of the fastening element engages in a receptacle of a second component for the frictional and/or interlocking connection of the two components. According to the invention, the securing element is pre-fastened to the second component before a first connection of the first component to the second component and is separated from the second component and reaches around the shaft of the fastening element after a first release of the connection between the first component and the second component.

12 Claims, 2 Drawing Sheets

(52) U.S. Cl.
CPC ............ *F16B 5/0635* (2013.01); *F16B 41/00* (2013.01); *F16B 2200/403* (2018.08)

(58) Field of Classification Search
CPC ...... F16B 35/041; F16B 41/00; F16B 41/002; F16B 2200/403
USPC ................................. 411/352, 353, 411, 424
See application file for complete search history.

(56) References Cited

U.S. PATENT DOCUMENTS

| | | | | |
|---|---|---|---|---|
| 5,590,900 | A | * | 1/1997 | Duran ................. B60R 21/2035 24/453 |
| 5,782,595 | A | * | 7/1998 | Schneider ............... F16B 5/025 411/352 |
| 6,095,736 | A | * | 8/2000 | Miller ................... F16B 41/002 411/107 |
| 6,309,156 | B1 | * | 10/2001 | Schneider ............. F16B 41/002 411/353 |
| 6,832,869 | B2 | * | 12/2004 | Lauchner ................ F16B 39/04 403/204 |
| 6,864,787 | B1 | * | 3/2005 | Veach .................... B60Q 1/442 340/468 |
| 8,057,122 | B2 | * | 11/2011 | Schneider ............. F16B 35/041 403/408.1 |
| 2002/0172574 | A1 | * | 11/2002 | McCormack ......... F16B 5/0208 411/352 |
| 2003/0194287 | A1 | * | 10/2003 | Hageman .............. F16B 31/028 411/9 |
| 2010/0202856 | A1 | * | 8/2010 | Donovan ............... F16B 5/0208 411/546 |

FOREIGN PATENT DOCUMENTS

| | | |
|---|---|---|
| DE | 102006005107 A1 | 8/2007 |
| DE | 102007008372 A1 | 8/2007 |
| DE | 102010052195 A1 | 5/2012 |
| EP | 0532392 A1 | 3/1993 |

* cited by examiner

ASSEMBLY AND METHOD FOR SECURING A FASTENING ELEMENT

CROSS-REFERENCE TO A RELATED APPLICATION

This application is a National Phase Patent Application of International Patent Application Number PCT/EP2016/065010, filed on Jun. 28, 2016, which claims priority of German Patent Application Number 10 2015 113 288.5, filed on Aug. 12, 2015, the contents of all of which are incorporated herein by reference.

BACKGROUND

The invention relates to an arrangement and a method for securing a fastening element to a first component.

Arrangements of the generic type are known. These are also referred to as captive devices and comprise for example securing washers, securing rings or the like. These arrangements are intended to prevent fastening elements, for example screws, from getting lost during the separation of two components connected by the fastening element. The captive devices retain the fastening element on one of the components so that it is available for connecting the two components again.

DE 10 2010 052 195 discloses a screw unit. The screw unit is based on the object of having a simple construction and facilitating assembly. The document teaches the use of a screw with a groove. A spring washer can enter this groove during the screwing-in and unscrewing procedure so that the screw is clamped to a casing since the casing supports the spring washer.

DE 10 2007 008 372 discloses an assembly unit. In this, an assembly part is captively connected to a fastener. To this end, the fastener has a securing element which reaches behind a retaining element. For this purpose, the outer diameter of the securing element is designed to be larger than the inner diameter of the retaining element.

EP 0 532 392 A1 discloses a guide device. The device has a movable and a non-movable unit which can be screwed together by means of a screw. To prevent the screw from getting lost, a sleeve is mounted in its centre. This sleeve also moves with the screwing-in and unscrewing movement. However, since the movable unit has a fastening pin, the sleeve of the screw runs onto a seat therein. The seating of the sleeve in the pin prevents further unscrewing of the screw. This prevents it from getting lost.

In the known prior art, it is disadvantageous that, during the initial assembly, the securing element also has to be taken into account in an additional assembly step.

SUMMARY

The invention is now based on the object of providing an arrangement and a method for securing a fastening element to a first component, in which a captive device for a fastening element is realised in a simple manner.

According to the invention, the object is achieved by an arrangement having the features mentioned in Claim 1. As a result of the securing element being pre-fixed to the second component before an initial connection of a first component to a second component and being separated from the second component and reaching around the shaft of the fastening element after the initial release of the connection between the first component and the second component, it is advantageously possible that, during assembly, i.e. the connection of the components, the fastening element simply has to be guided through a through-hole in the first component and engages with its shaft in a fastening portion of the second component, thereby simultaneously reaching through the securing element. Therefore, a positioning of the securing element is not realized by means of an additional assembly step, but through the provision of the second component. In particular in the case of automated assembly, for example when completing a motor vehicle, it is therefore possible to dispense with the assembly step for providing and positioning a securing element since this is already pre-fixed to the second component. After an initial dismantling of the components, the securing element is released from the second component and remains on the shaft of the fastening element so that the fastening element is captively retained in the through-hole of the first component.

In a preferred embodiment of the invention, it is provided that the shaft of the fastening element has a barrier for reaching behind the securing element during the initial connection of the first component to the second component, wherein the barrier is preferably a barb or a threaded flank of a fastening element constructed as a screw, which threaded flank increases along the circumference. It is thus possible, in a simple manner, to bring the fastening element, in particular the shaft of the fastening element here, into interlocking engagement with the securing element so that, when the fastening element is released, the shaft separates the securing element from the second component and this element remains behind the barrier on the fastening element.

In a further preferred embodiment, it is provided that the securing element is made from an elastic material, preferably from rubber. Since elastic materials are relatively easily deformable, they are particularly suitable for the construction of the securing elements since the fastening element with its shaft and the barrier arranged thereon can therefore be pushed through a through-hole in the securing element and the barrier reaches behind the securing element.

In a further preferred embodiment of the invention, it is provided that the securing element is a washer or a cap. Securing elements which are designed in this way can be pre-fixed to the second component in a particularly simple manner. In particular, a pre-fixing of the securing element to the second component can take place with a retaining force which is relatively low, so that it is readily possible to remove the securing washer by means of the barrier of the fastening element during the initial separation of the two components.

In a preferred embodiment of the invention, it is furthermore provided that the first component is part of a motor vehicle body and the second component is an equipment element, in particular a motor vehicle lighting device, for example a light or a headlight, to be fastened to the motor vehicle body. It is therefore possible, in an automated assembly process, to at least pre-position the motor vehicle lighting device on the motor vehicle body in a simple manner by means of a fastening element. If the equipment element, in particular the motor vehicle light, is to be dismantled, this can take place by releasing the fastening element, wherein the securing element remains on the shaft of the fastening element here.

It is therefore impossible to lose the fastening element.

According to the invention, the object is furthermore achieved by a method having the features mentioned in Claim 11. As a result of the securing element being pre-fixed to the second component before an initial connection of a first component to a second component, the shaft of a fastening element reaching behind the securing element with a barrier during the connection of the two components and the securing element being separated from the second component and remaining on the shaft of the fastening element after an initial release of the two components, it is advantageously possible to position the securing element during the initial connection of the two components without an additional assembly step. As a result of pre-fixing the securing element to the second component, precise positioning of the securing element is possible so that the securing element arrives exactly in its specified assembly position during an assembly step for connecting the two components.

In a preferred embodiment of the invention, it is provided that the securing element is pre-fixed to the second component by adhesion or clamping. It is thus possible to pre-fix the securing element in its desired position in a simple manner.

Further preferred embodiments of the invention are revealed in the remaining features mentioned in the sub-claims.

BRIEF DESCRIPTION OF THE DRAWINGS

The invention will be explained in more detail below in exemplary embodiments with the aid of the accompanying drawings in which.

DETAILED DESCRIPTION

Figure 1:
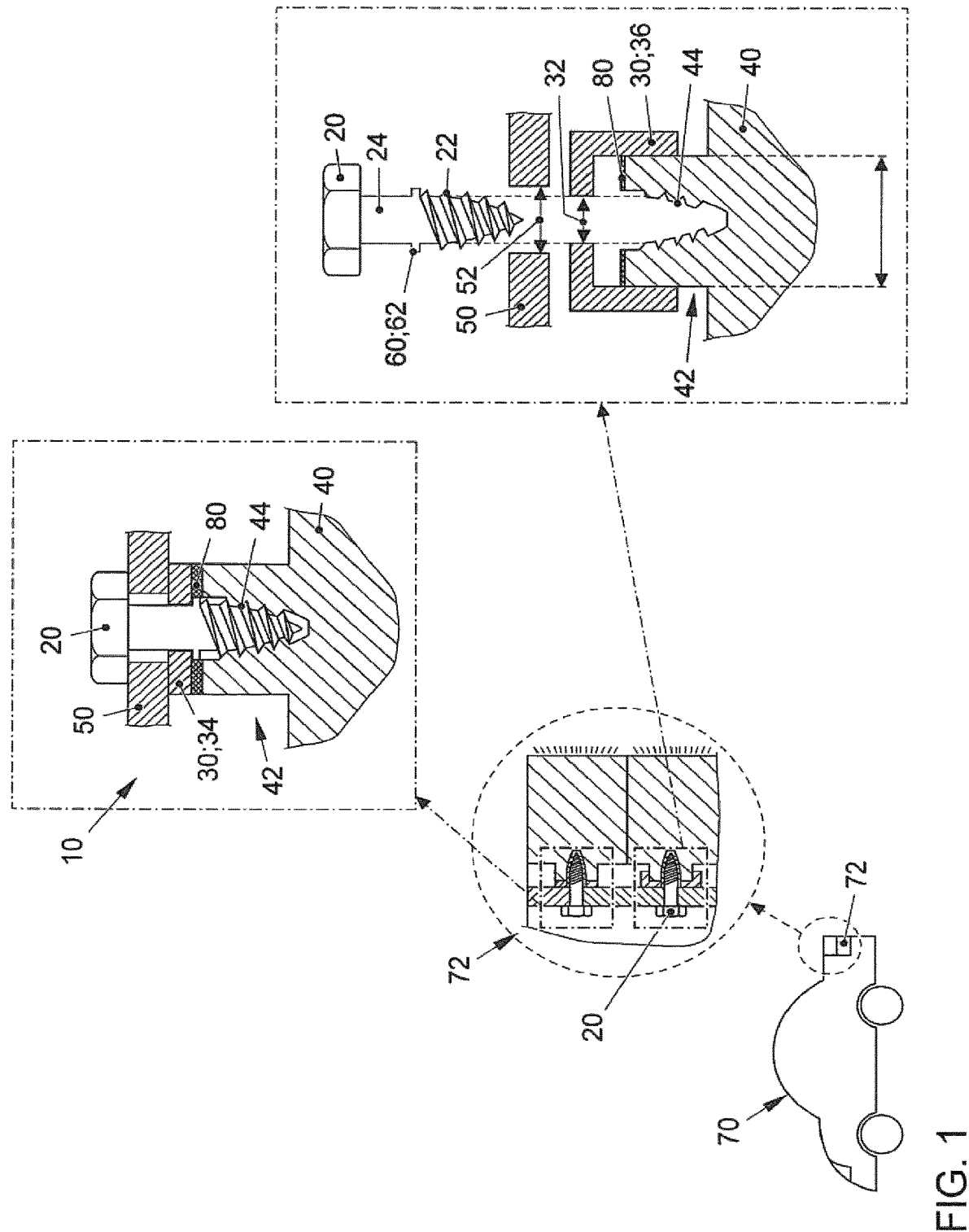
FIG. 1 shows a schematic illustration of the inventive arrangement for securing a fastening element and FIG. 2 shows the inventive arrangement in various assembly steps.

A vehicle 70 is firstly illustrated schematically in FIG. 1, which vehicle comprises various motor vehicle lighting devices, for example headlights or taillights, in a known manner. For explanation of the exemplary embodiment, reference is made below to a motor vehicle lighting device 72 on the rear of the vehicle 70. The motor vehicle lighting device 72 is fixed to a vehicle body during the final assembly of the vehicle 70. At least one fastening element 20 serves for this purpose, which fastening element, according to the illustrated exemplary embodiment, is constructed as a screw. The term fastening element is therefore defined below by the term screw 20. It is of course clear that, instead of the screw, this also includes a different fastening element by means of which the inventive arrangement for securing the fastening elements can be realized.

The arrangement according to the invention is clarified in the magnified illustrations in FIG. 1.

The arrangement comprises at least one screw 20 having an external thread 22, at least one securing element 30 having an opening 32, a first component 50 having a through-hole 52 and at least one second component 40 having an internal thread 44. The second component 40 is to be frictionally connected to the first component 50 by means of the screw 20.

The first component 50 here is a bracket of the vehicle body. In a preferred embodiment, the bracket 50 is a plate which can be part of the vehicle body of the vehicle 70. The second component 40 is part of a housing of the motor vehicle lighting device 72.

The screw 20 reaches through the through-hole 52 of the bracket 50 and the opening 32 of the securing element 30. The screw 20 has a shaft 24 which is provided with an external thread 22.

An integrated insert 42, which has an internal thread 44, is located in the component 40. The external thread 22 of the screw 20 and the internal thread 44 of the insert 42 correspond to one another so that the screw 20 can be screwed into the insert 42. The component 40 is thus frictionally connected to the bracket 50.

The insert 42 can be connected to the component 40 in a frictional, interlocking or bonded manner. According to a further variant embodiment, the internal thread 44 can also be provided directly in a wall of the housing 40 of the motor vehicle lighting device 72.

The securing element 30 is arranged on the component 40 such that the opening 32 corresponds to the depression in the component 40 or insert 42, which depression has the internal thread 44. The securing element 30 here can be constructed as a washer 34 or as a cap 36. The securing element 30 is connected to the component 40 via a bonding agent, for example an adhesive layer 80. The securing element 30 therefore has a defined position on the component 40.

If the securing element 30 is constructed as a cap 36, it is possible to dispense with the formation of the adhesive layer 80. The cap 36 is constructed here such that it reaches around a corresponding structure of the component 40 or the insert 42 in a clamping manner by means of its circumferential collar. According to an exemplary embodiment (not illustrated) the collar of the cap 36 can also engage in a corresponding recess of the insert 42.

The shaft 24 of the screw 20 furthermore has a barb 62 constructed as a barrier 60. The barb 62 is formed here by an annular collar extending radially around the shaft 24. An external diameter of the barrier 60 is dimensioned here such that it is smaller than or equal to the through-opening 52 in the component 50. However, the external diameter of the barrier 60 is greater than the diameter of the opening 32 of the securing element 30.

With reference to the arrangement shown schematically in FIG. 1, it is clear that the securing element 30 is arranged on the component 40—according to the exemplary embodiment, on the motor vehicle lighting device 72—before an initial connection of the components 40 and 50. The securing element 30 is therefore already in a pre-fixed position relative to the fastening element, i.e. the screw 20, during an assembly step.

Figure 2:
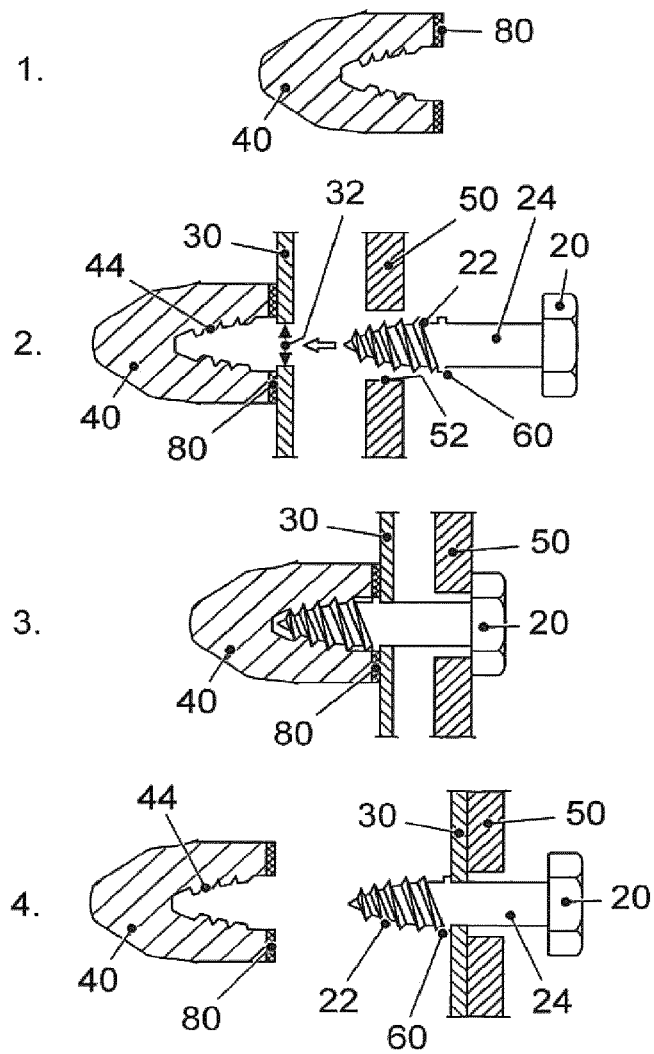

The function of the inventive arrangement for securing a fastening element is clarified with reference to FIG. 2. FIG. 2 illustrates a sequence of assembly steps during an initial connection of the components 50 and 40 to one another and an initial release of this connection.

The sequence of method steps is illustrated from top to bottom in the illustration in FIG. 2.

The adhesive layer 80 is applied to the component 40 in a first method step. As the method step 2 clarifies, the securing element 30 is then pre-fixed to the component 40 on this adhesive layer. The component 40 is positioned with the component 50 such that the screw 20 can pass through both the through-opening 52 and the opening 32 with its shaft 24.

In a third assembly step, the external thread 22 of the screw 20 is screwed into the internal thread 44 of the component 40. With this, both the external thread 22 and the barrier 60 pass through the opening 32 in the securing element 30. The securing element 30 is preferably made from an elastic material, for example rubber. The securing element 30 can also be made from a plastics material. The securing element 30 therefore yields in the region of the opening 32 so that the barrier 60 can pass through the opening 32. By applying a screw force to the head of the screw 20, a frictional connection between the components 40 and 50 is therefore realized.

If this connection between the components 40 and 50 is to be released again, the screw 20 is unscrewed with its external thread 22 out of the internal thread 44. With this, the barrier 60 comes into bearing contact with the securing element 30. The force applied to the securing element 30 by the barrier 60 is greater here than the adhesive force between the securing element 30 and the component 40 via the adhesive layer 80. The securing element 30 thus breaks away from the adhesive layer 80 and therefore from the component 40 and remains on the shaft 24 of the screw 20. The securing element 30 therefore constitutes a captive device for the screw 20 on the component 50. The screw 20 is therefore prevented from getting lost during the dismantling of the components 40 and 50 and is immediately re-available for assembling the component 40 again or a different component 40.

LIST OF REFERENCE SIGNS

20 Fastening element/screw
22 External thread
24 Shaft
30 Securing element
32 Opening
34 Washer
36 Cap
40 Second component/equipment element to be fastened/motor vehicle lighting device
42 Inserts
44 Internal thread
50 First component/bracket
52 Through-hole
60 Barrier
62 Barb
70 Vehicle
72 Motor vehicle lighting device
80 Adhesive layer

The invention claimed is:

1. An arrangement for securing a fastening element to a first component, wherein the first component has a through-hole for a shaft of the fastening element, said arrangement having a securing element, which reaches around the shaft of the fastening element, wherein a head part of the fastening element and the securing element are arranged on opposite sides of the first component and the shaft of the fastening element engages in a receiving means of a second component for a frictional and/or interlocking connection of the first and second components, wherein the securing element is pre-fixed to the second component before the connection of the first component to the second component and is separated from the second component and reaches around the shaft of the fastening element after an initial release of the connection between the first component and the second component.

2. The arrangement according to claim 1, wherein the shaft of the fastening element has a barrier for reaching behind the securing element during the connection of the first component to the second component.

3. The arrangement according to claim 2, wherein the barrier is a barb.

4. The arrangement according to claim 2, wherein the barrier is a threaded flank increasing in circumference.

5. The arrangement according to claim 1, wherein the securing element is made from an elastic material.

6. The arrangement according to claim 1, wherein the securing element is a washer.

7. The arrangement according to claim 1, wherein the securing element is a cap.

8. The arrangement according to claim 1, wherein the first component is part of a motor vehicle body.

9. The arrangement according to claim 8, wherein the second component is an equipment element to be fastened to the motor vehicle body.

10. The arrangement according to claim 9, wherein the equipment element is a motor vehicle lighting device.

11. A method for securing a fastening element to a first component by means of a securing element which is arrangeable on a shaft of the fastening element so that a head part of the fastening element and the securing element are arranged on opposite sides of the first component, wherein the securing element is pre-fixed to a second component before a connection of the first component to the second component, the shaft of the fastening element reaches behind the securing element with a barrier during the connection of the first and second components and the securing element is separated from the second component and remains on the shaft of the fastening element after an initial release of the first and second components.

12. The method according to claim 11, wherein the securing element is pre-fixed to the second component by adhesion or clamping.

* * * * *